United States Patent [19]

Gold

[11] Patent Number: 5,788,318

[45] Date of Patent: Aug. 4, 1998

[54] MOUNTED VEHICLE WINDOW

[76] Inventor: Peter Gold, 465 N. Wood Rd., Rockville Centre, N.Y. 11570

[21] Appl. No.: 730,391

[22] Filed: Oct. 15, 1996

[51] Int. Cl.$^6$ ............................................. B60J 1/00
[52] U.S. Cl. ........................ 296/146.15; 296/84.1; 296/96.21; 296/201; 156/91; 156/108; 52/208; 52/DIG. 13
[58] Field of Search ..................... 296/84.1, 96.21, 296/146.15, 201; 52/208, DIG. 13; 24/DIG. 11; 156/91, 108

[56] References Cited

U.S. PATENT DOCUMENTS

| | | | |
|---|---|---|---|
| 4,239,829 | 12/1980 | Cohen | 296/96.21 X |
| 5,516,183 | 5/1996 | Gold | 296/146.15 |
| 5,522,636 | 6/1996 | Kolar, Jr. | 296/146.15 |

*Primary Examiner*—Dennis H. Pedder
*Attorney, Agent, or Firm*—Myron Amer PC

[57] ABSTRACT

A vehicle window seated in a vehicle opening bounded by a vertically oriented wall of a flange having additional respective inboard and outboard walls, the former extending beneath the vehicle window and the latter lying in the plane of the external surface of the vehicle window. Hook and loop connectors with a urethane deposit at their interface are adhesively secured in an interposed position to the vehicle window and to the inboard wall so that an unattached inboard length portion extending beyond the inboard wall is movable in an ascending direction. Before the urethane cures into a hardened condition, the vehicle window is raised, as need be, to position the external surface of the vehicle window in the same plane as the outboard wall to thereby contribute to a desired appearance in the installed vehicle window.

1 Claim, 2 Drawing Sheets

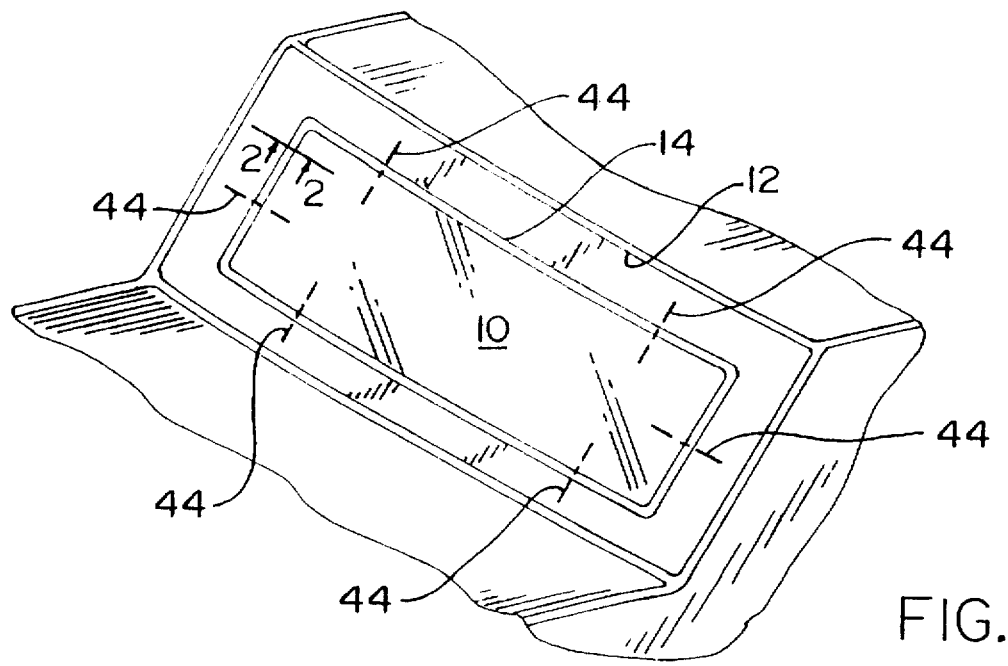
FIG. 1
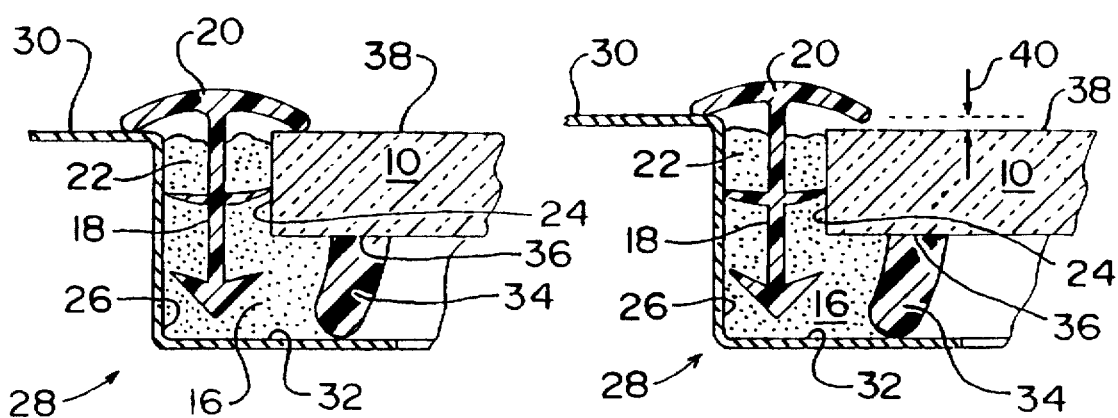
FIG. 2
PRIOR ART
FIG. 3
PRIOR ART

MOUNTED VEHICLE WINDOW

The present invention generally relates to improvements in the technique of installing an auto rear window, also possibly applicable to other window locations including even the front windshield, in which the improvements more particularly obviate inadvertent misalignment, due to unavoidable manufacturing tolerances, between the plane of the outer surface of the window and the plane of the body panel containing the opening into which the window is seated.

EXAMPLE OF THE PRIOR ART

As the title implies, namely "Method and Apparatus for Adjustably positioning Window Assemblies in Automotive Vehicles", U.S. Pat. No. 5,522,636 issued to Theodore V. Kolar, Jr. on Jun 4, 1996, is exemplary of prior art efforts to obviate misalignment and of proposed solutions calling for "spacers provided to maintain the perpendicular distance between the pane of glass and adjacent flange of the automotive body", as noted in this patent at column 1, lines 25–27.

These noted proposed, and all other known, solutions involve the use of "spacers", and are effective to achieve the purposes intended of obviating any misalignment only to the extent of the effectiveness of the spacer, of a selected height, to make up for the height difference between the plane of the exterior surface of the installed window and the plane of the automotive body or panel having the window opening.

Broadly, it is an object of the present invention to solve auto window installation misalignment overcoming the foregoing and other shortcomings of the prior art.

More particularly, it is an object to provide for manual adjustment of the window position in relation to the plane of the body panel, rather than being dependent upon a fixed, selected height of a spacer, to obviate misalignment during installation of the window, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a partial perspective view of an auto rear window;

FIG. 2 is a side elevational view, in section taken along line 2—2 of FIG. 1, illustrating the installed condition of a prior art molding about the peripheral edge of the window;

FIG. 3 is a view similar to FIG. 2 but illustrating a typical relationship of the molding to the window peripheral edge encountered incident to the installation of the molding;

Figure 4:
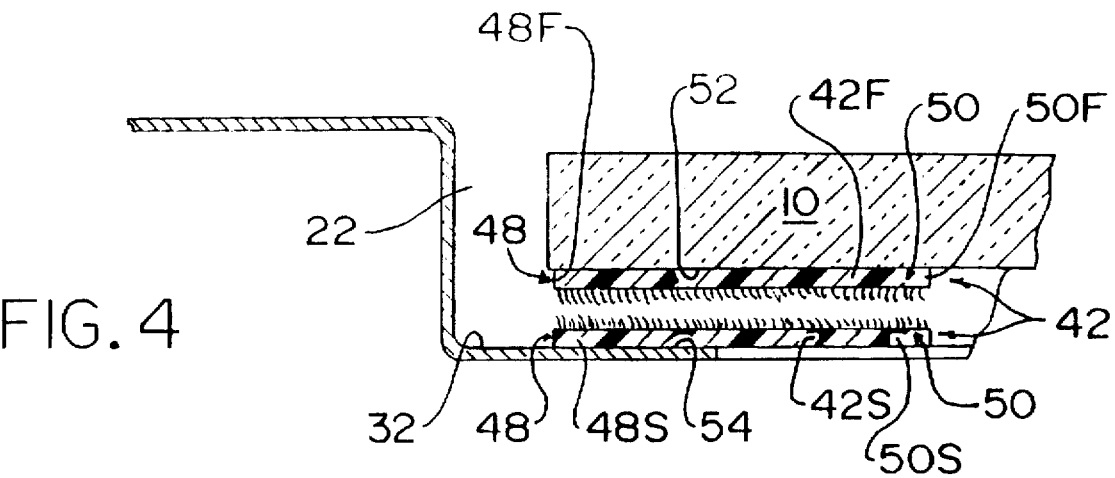
FIG. 4 is a side elevational sectional view, similar in perspective to FIGS. 2 and 3, but of the improved structure facilitating the installation of a rear window according to the present invention.
Figure 5:
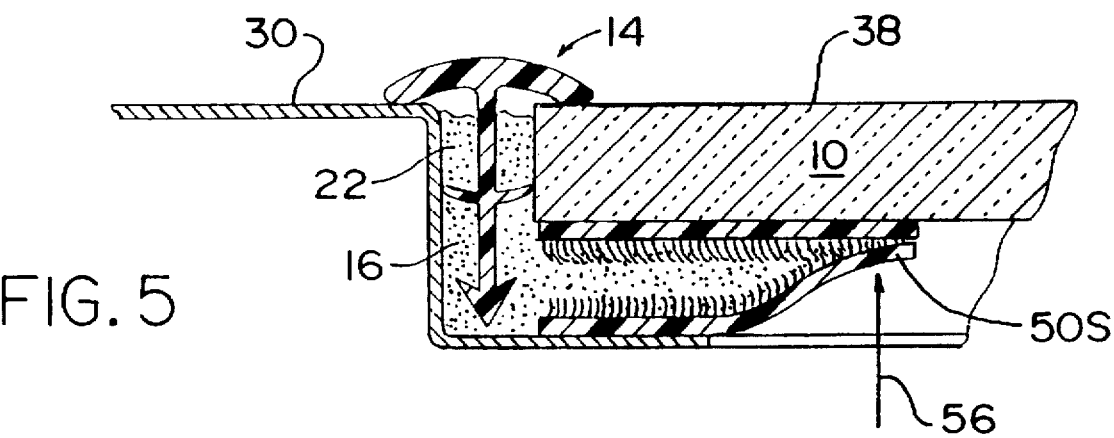
Figure 6:
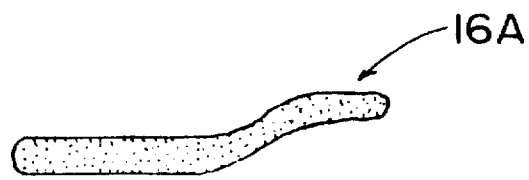

FIG. 5, like FIG. 4, illustrates further aspects of the facilitated window installation; and FIG. 6 is an isolated informational perspective view of cured urethane used in the window installation of FIGS. 4 and 5, that demonstrates how the window is supported in the auto window opening.

Shown in FIG. 1 is an auto rear window 10 which as known, typically is installed in the window opening 12 with an extruded rubber molding 14, cut to a length matching the dimension of the peripheral edge of the window 10, and installed, as best shown in FIGS. 2 and 3 in a position in which it is held in place by cured urethane 16 engaged to a depending stem 18 and positioning a crown 20 of the molding so it serves as a closure for a gap 22 between the window edge 24 and a vertical wall 26 of a flange, generally designated 28. The flange 28 is integral to a body panel 30 and in addition to the vertical wall 26 includes a horizontally oriented wall 32 on which a so-called appropriately sized dam 34 is adhesively secured to the window 10, as at 36, and the dam is thus in supported contact on wall 32 so that the upper window surface 38 is, for an optimum finished appearance in the same plane as the body panel 30, a display condition usually readily obtained by proper selection of the height of the dam 34. Due to manufacturing tolerances, however, the selected height of the dam 34, as demonstrated in FIG. 3, is too small in relation to the height of the vertical wall 26, and this mismatch results in a misalignment, denoted at 40, between the plane of the window surface 38 and the plane of the body panel 30.

In accordance with the present invention, alignment of the planes of the body panel 30 and window surface 38 with each other is assured because such alignment is readily facilitated, and the need to use a dam 34 is no longer a requirement, all as will now be explained in relation to FIGS. 4 and 5. More particularly, instead of dam 34 use is made of a selected number of strips, individually and collectively generally designated 42, with will be understood to be placed in spaced relation about the window 10, as at the locations 44 noted in FIG. 1. At each location 44, there will be a cooperating pair of first and second strips 42 of known hook and loop connectors 46, each having opposite outboard and inboard ends 48 and 50, as viewed in FIGS. 4 and 5.

Incident to the installation of the window 10, the first strip 42F has both its inboard end 50F and outboard end 48F adhesively connected to an underside surface, as at 52, to the window peripheral edge.

The second strip 42S is disposed in facing relation to the first strip 42F and has an outboard end 48S adhesively secured, as at 54, to the flange inboard wall 32 and an inboard end 50S which extends unattached laterally of the wall 32, it being significant to note that the unattached condition imparts a degree of movement 56 to the inboard end 50S, as illustrated in FIG. 5.

It will be understood that prior to the final deposit of urethane 16 in the gap 22, as shown in FIG. 5, that a pre-deposit of urethane is made in the hook and eye connectors of at least the strip 42S and the strips 42F and 42S pressed together (not shown but readily understood from FIG. 4). Following the pre-deposit of urethane 16, as just noted, an upward force is exerted in the direction 56 which is effective in lifting the window surface 38 so that it is at a resulting position of movement in which it is in the plane of the body flange 30. By an appropriate means, the position of the window 10 is maintained until the urethane 16 cures into a hardened state, as demonstrated by the isolated view of the cured urethane designated 16A in FIG. 6, and in such condition supports the window 10 in its raised position level with the body panel 30.

Next, the final urethane mass, denoted as 16 in FIG. 5 is deposited in the gap 22, and the molding 14 inserted into the urethane-filled gap 22 to complete the installation of the window 10, which as described is level with the body panel 30.

While the auto window installation herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements in a vehicle window mounted with an exterior surface in a plane of a vehicle panel, said vehicle panel being of a type having a flange bounding an opening sized and shaped to have said vehicle window seated in said opening, said flange having a vertically oriented wall delimiting said opening and an inboard wall extending inwardly of said opening in supporting relation beneath a peripheral edge of said vehicle window and an outboard wall means extending outwardly of said opening establishing said plane of said vehicle panel, said improvements in said vehicle window mounting comprising a cooperating pair of first and second strips of hook and loop connectors having opposite outboard and inboard ends, said first strip having said inboard and outboard ends adhesively connected to an underside surface of said peripheral edge of said vehicle window, said second strip disposed in facing relation to said first strip having said outboard end adhesively connected in superposed relation to said flange inboard wall with said inboard end extending unattached laterally of said flange inboard wall having a freedom of movement relative to said flange inboard wall, and a deposit of urethane at the interface of said hooks and loops of interconnected inboard and outboard ends of said first and second strips effective upon curing of said urethane deposit to connect said first and second strips to each other and to mount said vehicle window in said window opening, whereby incident to said urethane curing said vehicle window has an operative provided position of movement as permitted by said freedom of movement of said second strip to contribute to positioning said exterior surface of said vehicle window in said plane of said vehicle panel.

* * * * *